No. 725,174. PATENTED APR. 14, 1903.
C. THOMSON.
BALL CASTER.
APPLICATION FILED JUNE 4, 1900.
NO MODEL.
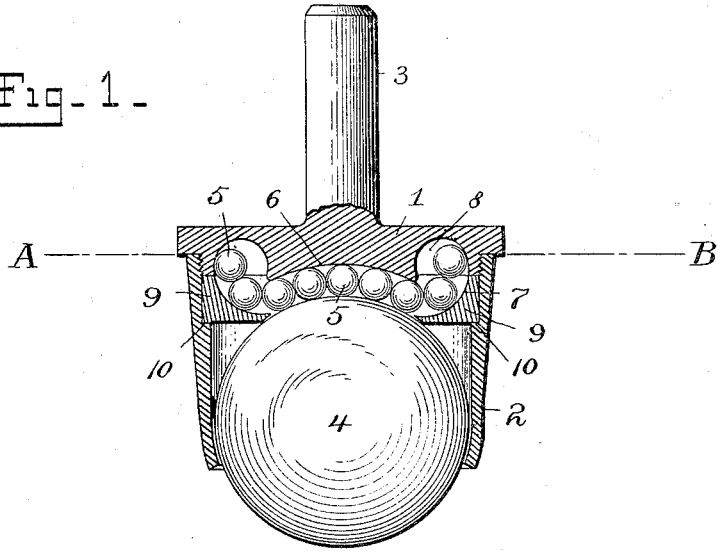
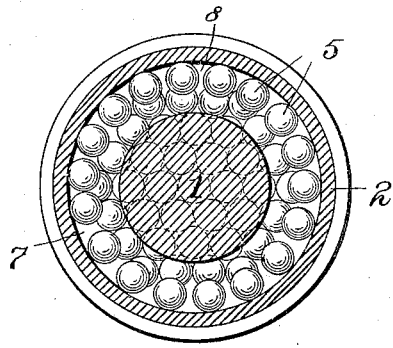
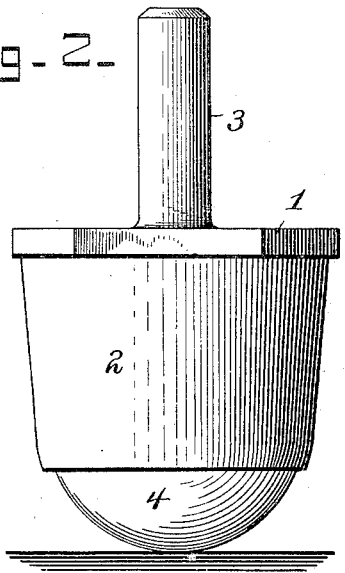
WITNESSES:
F. N. Roehrich
Edwin Segas
INVENTOR
Clifford Thomson
BY
Kenyon & Kenyon
ATTORNEYS

UNITED STATES PATENT OFFICE.

CLIFFORD THOMSON, OF EAST ORANGE, NEW JERSEY, ASSIGNOR TO THE ACME BALL BEARING CASTER COMPANY, A CORPORATION OF NEW JERSEY.

BALL-CASTER.

SPECIFICATION forming part of Letters Patent No. 725,174, dated April 14, 1903.

Application filed June 4, 1900. Serial No. 19,008. (No model.)

*To all whom it may concern:*

Be it known that I, CLIFFORD THOMSON, a citizen of the United States, and a resident of East Orange, county of Essex, and State of New Jersey, have invented certain new and useful Improvements in Ball-Casters, of which the following is a specification.

My invention relates to that class of ball-casters in which the larger bearing-ball supports its load through the intervention of a number of relatively smaller antifriction-balls, and more particularly to that type of such casters in which a ball-guiding relief-chamber is provided to receive the antifriction-balls as they leave the bearing-ball and guide them back to another point on the bearing-ball, where they are needed to take active part in supporting the load carried by the caster and prevent friction. In constructing casters of this special type it has heretofore been considered necessary not only to make the distance between the walls of the ball-guiding chamber materially greater than the diameter of the antifriction-balls, but also to make the said chamber of considerable size and extend it to the rear of the member carrying the bearing-surface of the caster, so as to form a kind of a reservoir for the antifriction-balls. This construction, although satisfactory in operation, necessitates the use of a large number of antifriction-balls and is otherwise expensive to manufacture.

My invention has for an object to provide, in a caster of the type referred to, a ball-guiding relief-chamber of such form and dimensions as to permit of the caster being constructed and operated with a much smaller number of antifriction-balls than is required in such casters as heretofore constructed.

Other objects of my invention are to do away with the necessity of a separate bearing member and to otherwise improve and simplify and cheapen the construction of the type of caster referred to.

My invention consists of the novel features of construction and combinations of parts herein described.

The accompanying drawings, which are referred to herein and form a part hereof, illustrate, by way of example, one embodiment of my invention and serve in connection with the following description to explain the principles thereof and the best mode in which I have contemplated applying those principles.

Of the drawings, in which like reference-numerals refer to like parts, Figure 1 is a vertical central section of the casing of a caster constructed in accordance with my invention, the bearing-ball and the antifriction-balls being shown in elevation. Fig. 2 is a side elevation of the caster, and Fig. 3 is a transverse section of the same in line A B of Fig. 1.

Referring to the drawings in detail, the casing of the caster is represented for convenience of construction as consisting of two separable parts 1 and 2, said parts being preferably secured together by means of corresponding screw-threads formed on their meeting ends, as shown. The casing of the caster is provided with suitable means by which it may be attached to a piece of furniture or other object. In the example shown this means comprises a pin 3, carried by the upper part 1 of the casing. Within the casing thus formed a cavity is provided, in which the coöperative or functional parts of the caster are located. These parts consist of a larger bearing-ball 4, a plurality of smaller antifriction-balls 5, a concave bearing-surface 6, an annular ball-guiding surface 7, and a ball-guiding relief-chamber 8. As shown, the concave bearing-surface 6 is centrally located in the upper end of the cavity and is preferably formed directly on the lower end of the upper part 1 of the casing. The bearing-surface 6 should have a curvature such that when the ball 4 is separated therefrom by the antifriction-balls 5 or by a space equal to the diameter of said antifriction-balls the bearing-surface and the bearing-ball will be substantially concentric with each other. The bearing-surface 6 is preferably circular in outline, and it should be of such dimensions that there are always three at least of a diametrical line of the antifriction-balls in contact therewith. The annular guiding-surface 7 preferably forms the upper surface of a ring 9, which is separate from the main casing and preferably is removably clamped in place between the lower end of the upper part 1 and an annular shoulder 10 of the lower part 2 of the casing, as shown. The surface 7 is thus fixed with relation to both the bearing-surface and the bearing-ball and is so located as to guide the antifriction-balls 5 away from the surface of the bearing-ball 4 as they pass from between the bearing-ball 4 and the bearing-surface 6, or very soon thereafter. The surface 7 should be curved, so as to form a continuous annular concaved surface, substantially as shown. The annular surface 7 serves to guide the balls toward and into the chamber 8, which is annular in form and is located adjacent to the bearing-surface 6, substantially as shown. The inner walls of the chamber 8 are curved and should form a continuation of the curved surface 7, and preferably the ring 9 is of such form and dimensions that the surface 7 forms a portion of the walls of the chamber 8. The chamber 8 surrounds the bearing-surface 6 and preferably is concentric therewith and extends above the outer edge of the surface 6 when the caster is in an upright position, as shown. It is essential that the distance between the opposite walls of the chamber 8 should be materially greater in every direction than the diameter of the antifriction-balls 5 and that they have a substantially unbroken curved conformation in order to prevent the binding of said balls when in action. On the other hand, while there is no definite limit to the maximum size of the annular chamber 8, it is desirable to make the space in said chamber as small as possible in order that the caster may be constructed with the minimum number of antifriction-balls. I have found that the caster may be made to operate smoothly and without binding with a minimum number of antifriction-balls when substantially the whole of the ball-guiding relief-chamber is located beyond the periphery of the bearing-surface and is made substantially elliptical or oblong in cross-section with the minor axis not more than once and a half and the major axis not more than twice the diameter of the antifriction-balls. For the sake of economy in space and materials and for convenience of construction the relief-chamber is preferably arranged with its major axis at substantially a right angle with the general plane of the bearing-surface 6 and with the annular opening, through which the balls enter and leave the chamber, located at the inner side of the portion thereof which is adjacent to the main bearing-ball, substantially as shown. Any other form or arrangement of the annular chamber which may be suited to a particular form of caster may be adopted.

In operation the antifriction-balls 5 are guided away from the advancing side of the bearing-ball 4 by the guiding-surface 7 and into the chamber 8, through which they are passed laterally in either direction by the force of the stream of balls issuing from between the bearing-ball and the bearing-surface 6, and by the walls of which chamber the antifriction-balls are guided back to the opposite side of the caster, where they are needed to perpetuate the stream of balls forming the antifriction-bearing for the bearing-ball. Owing to the size of the chamber 8 and to the conformation of its walls the idle or return antifriction-balls flow freely therethrough, and consequently any binding of the balls when the caster is in operation is lessened or prevented. By reason of the annular form of the ball-guiding surfaces the caster is free to move in any direction.

My invention is not limited to the particular construction shown and described, nor to the particular construction by which it may be carried into effect, as many changes may be made therein without departing from the principles of my invention or sacrificing its chief advantages.

What I claim as new, and desire to secure by Letters Patent, is—

1. A ball-caster comprising a casing having a cavity formed therein, a bearing-ball held in coöperative relation with the casing, a concave bearing-surface located within said cavity and adjacent to the bearing-ball, an annular chamber formed in said cavity around and wholly beyond the periphery of the bearing-surface and adjacent to the bearing-ball, antifriction-balls located between the bearing-ball and the bearing-surface and also in said chamber, the distance between the walls of the said chamber and the conformation of said walls being such as to form the return-ball-guiding chamber of the caster, substantially as described.

2. A ball-caster comprising a casing having a cavity formed therein, a bearing-ball held in coöperative relation with the casing, a concave bearing-surface located within said cavity and adjacent to the bearing-ball, an annular chamber formed in said cavity around and wholly beyond the periphery of the bearing-surface and adjacent to the bearing-ball, antifriction-balls located between the bearing-ball and the bearing-surface, and also in said chamber, and means forming a suitable marginal guide for said antifriction-balls, the distance between the walls of the said chamber and the conformation of said walls being such as to form the return-ball-guiding chamber of the caster and prevent binding of the balls when in operation, substantially as described.

3. A ball-caster comprising a casing having a cavity formed therein, a bearing-ball in said cavity, a concave bearing-surface located within said cavity and adjacent to the bearing-ball, an annular chamber formed in said cavity around the bearing-surface and adjacent to the bearing-ball, antifriction-balls located between the bearing-ball and the bearing-surface, and also in said chamber, substantially the whole of said annular chamber being located beyond the periphery of the bearing-surface and the distance between the walls of said chamber being materially greater than the diameter of the antifriction-balls, whereby the caster may be operated with a minimum number of antifriction-balls, substantially as described.

4. A ball-caster comprising a casing having a cavity formed therein, a bearing-ball in said cavity, a concave bearing-surface located within said cavity and adjacent to the bearing-ball, an annular chamber formed in said cavity around the bearing-surface and adjacent to the bearing-ball, antifriction-balls located between the bearing-ball and the bearing-surface and also in said chamber, and a ring forming a suitable marginal guide for said antifriction-balls, substantially the whole of said annular chamber being located beyond the periphery of the bearing-surface and the distance between the walls of said chamber being materially greater than the diameter of the antifriction-balls whereby the caster may be operated with a minimum number of antifriction-balls, substantially as described.

5. A ball-caster comprising a casing having a cavity formed therein, a bearing-ball held in coöperative relation with the casing, a concave bearing-surface formed directly on the inner walls of said casing adjacent to the bearing-ball, an annular chamber formed in said cavity around and wholly beyond the periphery of the bearing-surface and adjacent to the bearing-ball, and antifriction-balls located between the bearing-ball and the bearing-surface and also in said chamber, the distance between the walls of the said chamber and the conformation of said walls being such as to form the return-ball-guiding chamber of the caster, substantially as described.

6. A ball-caster comprising a casing having a cavity formed therein, a bearing-ball held in coöperative relation with the casing, a concave bearing-surface located within said cavity and adjacent to the bearing-ball, an annular chamber formed in said cavity around and wholly beyond the bearing-surface and adjacent to the bearing-ball, and antifriction-balls located in said chamber and between the bearing-ball and the bearing-surface, said chamber being substantially oblong in section and having a space between its walls materially greater than the diameter of the antifriction-balls, whereby binding of the balls when in operation is prevented, substantially as described.

7. A ball-caster comprising a two-part casing, one part of which has formed thereon a central concave bearing-surface and an annular concave recess, a bearing-ball located in the other part of said casing, a ring having an inner concave surface located between the parts of the casing, said annular recess and said ring forming between them an annular chamber, and antifriction-balls located between the bearing-ball and the bearing-surface and also in said annular chamber the distance between the walls of said chamber and the conformation of the said walls being such as to form a relief-chamber and prevent binding of the balls when in operation, substantially as described.

In testimony whereof I have signed my name to this specification in the presence of two subscribing witnesses.

CLIFFORD THOMSON.

Witnesses:
J. H. FREEMAN,
EDWIN SEGER.